United States Patent Office 3,364,207
Patented Jan. 16, 1968

3,364,207
POLYHYDROSPIRO[ESTR/ANDROST-4-ENE-17,2'-FURAN/PYRAN]-3-ONE AND INTERMEDIATES
Edward A. Brown, Wilmette, Ill., assignor to G. D. Searle & Co., Chicago, Ill., a corporation of Delaware
No Drawing. Continuation-in-part of application Ser. No. 216,346, Aug. 13, 1962. This application Dec. 16, 1965, Ser. No. 514,381
7 Claims. (Cl. 260—239.55)

The application for Letters Patent securing the invention hereinafter described and claimed is a continuation-in-part of applicant's prior copending application Ser. No. 216,346 filed Aug. 13, 1962, and now abandoned.

This invention relates to polyhydrospiro[estr/androst-4-ene-17,2'-furan/pyran] - 3 - one, intermediates thereto, and processes for the preparation thereof. More particularly, this invention provides compounds of the formula

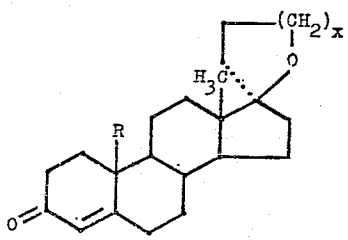

wherein R represents hydrogen or the methyl radical, and x represents a positive integer less than 3.

The compounds to which this invention relates are useful by reason of their valuable, various, and unexpected pharmacological properties. Thus, for example, the above-enformulated compounds are, with one exception, progestational agents. The exception is 3',4',5',6'-tetrahydrospiro[androst - 4 - ene - 17,2'-[2H]pyran]-3-one, which is distinguished not only by a lack of progestational activity, but by its capacity to inhibit dicotyledenous seed germination. The latter compound also—surprisingly—inhibits the growth of *Tetrahymena gelleii* and counteracts the proteolysis of hemoglobin by pepsin. Another unexpected pharmacological distinction inhering in the above-enformulated compounds is the absence of myotrophic side-effects which characterizes 3',4',5',6'-tetrahydrospiro[estr-4-ene-17,2'-[2H]pyran] - 3 - one. The corresponding compound with one less methylene group in the ethereal ring, 4,5'-dihydrospiro[estr-4-ene-17,2'(3'H)-furan]-3-one, produces a substantial myotrophic response.

The chemical intermediates whereby the foregoing compounds eventuate are not only useful as such but, like the compounds derived therefrom, manifest valuable pharmacological properties wholly unforeshadowed by their structure. Thus, 3',4',5',6'-tetrahydro-3-methoxy-spiro[estra-1,3,5(10) - triene - 17,2'-[2H]pyran], an intermediate to 3',4',5',6'-tetrahydrospiro[estr - 4 - ene-17,2'-[2H]pyran]-3-one, inhibits exogenous hypercholesterolemia; the corresponding compound with one less methylene group in the ethereal ring does not.

Preparation of the compounds

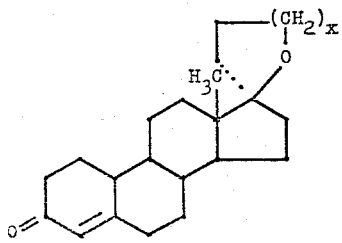

proceeds by reducing an appropriate lactone of the formula

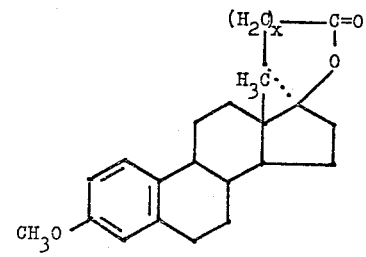

U.S. 2,875,199

(x in each instance being defined as above) to the corresponding 17β - hydroxy-17α-hydroxy(propyl/butyl) compound by heating with lithium aluminum hydride in ethereal solvent medium, dehydrating and cyclizing the diol by prolonged contact with p-toluenesulfonyl chloride and pyridine—supplemented in the case of the hydroxybutyl compound by heating with potassium tert-butoxide in a solvent medium—to form the 17-spiroether, reducing the A-ring with lithium and liquid ammonia in the presence of tert-butyl alcohol, and acidifying—either directly or following preliminary brief contact with aqueous alkanoic acid in appropriate concentration (whereby the $\Delta^{5(10)}$ isomer is obtained as an additional intermediate).

Preparation of the compounds

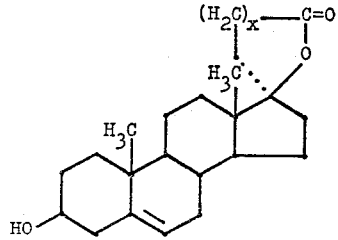

is accomplished by converting an appropriate lactone of the formula

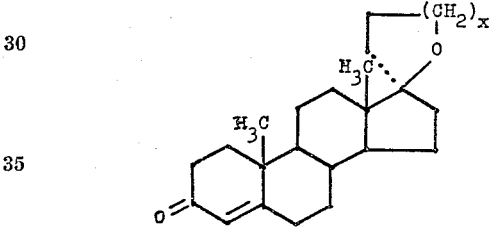

J. Org. Chem., 24, 743 (1959)

(x in each instance again being defined as above) to the corresponding 3β-tetrahydropyranyl ether with dihydropyran in the presence of phosphorus oxychloride; reducing the carbonyl group therein with lithium aluminum hydride as before; dehydrating the resultant 17β-hydroxy-17α-hydroxy(propyl/butyl) compound, cleaving the pyranyl ether linkage therein, and cyclizing with p-toluenesulfonyl chloride and pyridine as before; and subjecting the resultant 17-spiro ether to Oppenauer oxidation. Alternatively, protection of the 3β-hydroxyl by etherification with dihydropyran and phosphorus oxychloride can be omitted, albeit this can complicate the isolation procedure following dehydration, cleavage, and cyclization.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *3-(17β - hydroxy - 3 - methoxyestra-1,3,5(10)-trien-17α-yl)propanol*.—A suspension of 17 parts of lithium aluminum hydride in 2450 parts of anhydrous ether is heated at the boiling point under reflux with agitation for 45 minutes, whereupon a solution of 34 parts of 3-(17β-hydroxy - 3 - methoxyestra - 1,3,5(10) - trien - 17α yl)-propionic acid in 100 parts of dioxane is slowly introduced. The resultant mixture is heated at the boiling point under reflux with agitation for 4 hours, then hydrolyzed by cautious addition of 70 parts of ether saturated with water, followed by 50 parts of water. Insoluble solids are filtered off, digested with 1050 parts of aqueous 10% hydrochloric acid, washed with water, and dried at 60°, while the filtrate is allowed to stand at 5° during further precipitation of solids, which are filtered off, dried at 60°, and combined with those previously isolated. Recrystallization of the combined solids from ethanol affords 3-(17β-hydroxy - 3 - methoxyestra - 1,3,5(10) - trien - 17α - yl)-propanol melting at approximately 165–166°.

B. *4',5' - dihydro - 3 - methoxyspiro[estra - 1,3,5(10) - triene - 17,2'(3'H) - furan]*.—A solution of 215 parts of 3 - (17β - hydroxy - 3 - methoxyestra - 1,3,5(10) - trien - 17α-yl)propanol in 2500 parts of pyridine and 215 parts of p-toluenesulfonyl chloride is allowed to stand at room temperatures for 22 hours, whereupon 10,000 parts of ice and water is mixed in. The precipitate thrown down is filtered off, washed well with water, and dried at 60°. The product thus isolated is 4',5'-dihydro-3-methoxyspiro[estra-1,3,5(10)-triene-17,2'(3'H)-furan].

C. *4',5' - dihydrospiro[estr - 4 - ene - 17,2'(3'H) - furan]-3-one*.— To a solution of 17 parts of 4',5'-dihydro-3-methoxyspiro[estra - 1,3,5(10) - triene-17,2'(3'H)-furan] in a mixture of 400 parts of tert-butyl alcohol and 700 parts of tetrahydrofuran is cautiously added, with agitation, 680 parts of liquid ammonia, followed during 10 minutes by 10 parts of lithium wire cut in small pieces. The resultant mixture is maintained under reflux with agitation while the blue color persists, whereupon the ammonia is allowed to evaporate. At this point, 45 parts of methanol and 1000 parts of water are consecutively introduced; and the resultant mixture is concentrated to ½-volume by vacuum distillation. The precipitate which forms is filtered off, dried in air, and dissolved in a mixture of 80 parts of methanol, 3 parts of water, and approximately 7 parts of concentrated hydrochloric acid at room temperature. The solution is held at room temperatures for 1 hour, then poured into 800 parts of water. The resultant precipitate, filtered off, washed with water, dried at 60°, and recrystallized from hexane, affords 4',5'-dihydrospiro[estr - 4 - ene - 17,2'(3'H) - furan] - 3 - one melting at 120–123°. The product has the formula

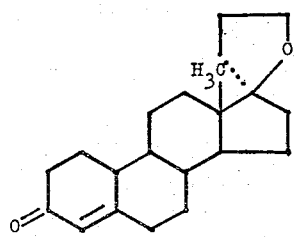

EXAMPLE 2

A. *4',5' - dihydrospiro[estr - 5(10) - ene - 17,2'(3'H)-furan]-3-one*.—To a solution of 510 parts of 4',5'-dihydro - 3 - methoxyspiro[estra-1,3,5(10)-triene-17,2'(3'H)-furan] in 12,000 parts of tert-butyl alcohol and 21,000 parts of tetrahydrofuran is cautiously added, with agitation, 20,400 parts of liquid ammonia, followed by 300 parts of lithium wire cut in small pieces. The resultant mixture is maintained under reflux with agitation while the blue color persists, whereupon the ammonia is allowed to evaporate. At this point, 1350 parts of methanol and 30,000 parts of water is consecutively introduced; and the resultant mixture is concentrated to ½-volume by vacuum distillation. The precipitate which forms is filtered off and dried in air. To 500 parts of this material dissolved in approximately 8000 parts of methanol and maintained with agitation at the boiling point under reflux is added a solution of 25 parts of oxalic acid dihydrate in 1800 parts of water. The resultant solution is maintained at the boiling point under reflux with agitation for precisely 6 minutes, whereupon a solution of 33 parts of sodium bicarbonate in 1000 parts of water is introduced, followed by 40,000 parts of cold water. The precipitate thrown down is filtered off, washed with water, and dried at 60°. The material thus isolated is 4',5'-dihydrospiro[estr-5(10)-ene-17,2'(3'H)-furan]-3-one.

B. *4', 5' - dihydrospiro[estr - 4 - ene - 17,2'(3'H)-furan] - 3 - one*.—A solution of 17 parts of 4',5' - dihydrospiro - [estr - 5(10) - ene - 17,2'(3'H) - furan] - 3-one in a mixture of 80 parts of methanol, 3 parts of water, and approximately 7 parts of concentrated hydrochloric acid is maintained at room temperatures for 1 hour, then poured into 800 parts of water. The resultant precipitate is filtered off, washed with water, dried at 60°, and recrystallized from hexane to afford 4',5' - dihydrospiro [estr - 4 - ene - 17,2'(3'H) - furan] - 3 - one melting at 120–123° and identical with the product of Example 1C.

EXAMPLE 3

A. *3 - [3β - (tetrahydropyran - 2 - yloxy) - 17β - hydroxyandrost - 5 - en - 17α - yl]propionic acid γ - lactone*.—To a suspension of 10 parts of 3 - (3β,17β - dihydroxyandrost - 5 - en - 17α - yl)propionic acid γ - lactone in approximately 100 parts of dihydropyran is added, with agitation during 3 minutes, 1 part of phosphorus oxychloride. Solution occurs. The solution is allowed to stand at room temperatures for 2½ hours, whereupon approximately 14 parts of methanolic 5% potassium hydroxide, 70 parts of methanol, and 40 parts of water are consecutively and cautiously introduced. The lower of the 2 liquid layers which form, is separated and concentrated by vacuum distillation until precipitation occurs. Approximately 18 parts of hexane is then mixed in, and the resultant slurry is filtered. The solid material thus isolated is the desired 3 - [17β - hydroxy - 3β - tetrahydropyran-2 - yloxy)androst - 5 - en - 17α - yl]propionic acid γ-lactone. Washed with hexane and dried in air, it melts at 175–178°.

B. *3 - [3β - (tetrahydropyran - 2 - yloxy) - 17β - hydroxyandrost - 5 - en - 17α - yl]propanol*.—To a suspension of 10 parts of lithium aluminum hydride in 600 parts of tetrahydrofuran is added, with agitation during 10 minutes, a solution of 37 parts of 3 - [17β - hydroxy-3β - (tetrahydro - pyran - 2 - yloxy)androst - 5 - en-17α - yl]propionic acid γ - lactone in 1060 parts of tetrahydrofuran. The resultant mixture is heated at the boiling point under reflux with agitation for 4 hours, then hydrolyzed by the cautious addition of 150 parts of tetrahydrofuran diluted with 11 parts of water. There is then slowly introduced 54 parts of water. Insoluble solids are removed by filtration and washed with 304 parts of tetrahydrofuran. Filtrate and washings are combined, concentrated to ¼-volume under nitrogen, and thereupon diluted with 217 parts of water. The precipitate thrown down is filtered off, washed with water, and dried in air. The material thus isolated is 3-[3β - (tetrahydropyran-2 - yloxy) - 17β - hydroxyandrost - 5 - en - 17α - yl] propanol melting at 212–217°.

C. *4',5' - dihydrospiro[androst - 5 - ene - 17,2'(3'H)-furan] - 3β - ol*.—A solution of approximately 20 parts of 3 - [3β - (tetrahydropyran - 2 - yloxy) - 17β - hydroxyandrost - 5 - en - 17α - yl]propanol in a mixture of 20 parts of p - toluene - sulfonyl chloride and 30 parts of pyridine is maintained at 25° for 24 hours, then diluted with 500 parts of ice and water. The precipitate thrown down is filtered off, washed with water, dried in air, and dissolved in 280 parts of methanol containing 13 parts of concentrated hydrochloric acid. The resultant solution is heated at the boiling point under reflux for 30 minutes, then chilled to 5°. The precipitate which forms is filtered off and dried in air. This material is 4',5' - dihydrospiro [androst - 5 - ene - 17,2'(3'H) - furan] - 3β - ol melting at 189–191°.

D. *4',5' - dihydrospiro[androst - 4 - ene - 17,2'(3'H)-furan] - 3 - one.*—A mixture of 8 parts of 4',5' - dihydrospiro - [androst - 5 - ene - 17,2'(3'H) - furan] - 3β - ol, 8 parts of aluminum isopropoxide, 50 parts of cyclohexanone, and approximately 430 parts of dry toluene is heated at the boiling point under reflux in an atmosphere of nitrogen with agitation for 30 minutes, then hydrolyzed by the cautious introduction of 30 parts of saturated aqueous Rochelle salt solution. The mixture thus obtained is steam distilled to remove the toluene and excess cyclohexanone. The residual aqueous slurry is consecutively extracted with ether and ethyl acetate. The extracts are combined, washed with water, dried over anhydrous sodium sulfate, and stripped of solvent by vacuum distillation. The oily residue, crystallized from hexane, affords 4',5' - dihydrospiro - [androst - 4 - ene-17,2'(3'H) - furan] - 3 - one melting at 87–89°. The product has the formula

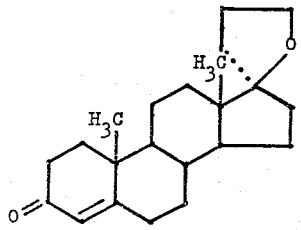

EXAMPLE 4

A. *3',4',5',6' - tetrahydro - 3 - methoxyspiro - [estra-1,3,5(10) - triene - 17,2' - [2H]pyran].*—A mixture of 169 parts of 3 - (17β - hydroxy - 3 - methoxyestra-1,3,5(10) - trien - 17α - yl)butanol, 169 parts of p - toluenesulfonyl chloride, and 1800 parts of pyridine is held at 25° for 20 hours and then hydrolyzed by adding 10,000 parts of a mixture of ice and water. The oil which separates is extracted with ethyl acetate. The extract is washed well with water, dried over anhydrous sodium sulfate, and stripped of solvent by vacuum distillation. To the resultant partially crystalline residue is added a mixture of 130 parts of potassium tert-butoxide and 5600 parts of tert - butyl alcohol. The mixture thus obtained is heated at the boiling point under reflux with agitation for 2 hours, then cooled to 25° and diluted thereat with 7000 parts of ether. The resultant solution is washed well with water, dried over anhydrous sodium sulfate, and stripped of solvent by distillation to give 3',4',5',6' - tetrahydro - 3 - methoxyspiro - [estra - 1,3,5 (10) - triene - 17,2' - [2H]pyran] as an oily residue which crystallizes in contact with ethyl acetate. The crystalline product, separated by filtration and dried in air, melts at 108–111°.

B. *3',4',5',6' - tetrahydro - 3-methoxyspiro-[estra-2,5 (10)-diene-17,2'-[2H]pyran].*—To a solution of 35 parts of 3',4',5',6' - tetrahydro-3-methoxyspiro-[estra-1,3,5(10)-triene-17,2'[2H]-pyran] in a mixture of 960 parts of tert-butyl alcohol and 1080 parts of tetrahydrofuran is cautiously added, with agitation, approximately 1680 parts of liquid ammonia, followed during 10 minutes by 24 parts of lithium wire cut in small pieces. The resultant mixture is maintained under reflux with agitation while the blue color persists (approximately 2½ hours), whereupon 80 parts of methyl alcohol is introduced and the ammonia then allowed to evaporate. At this point, 2000 parts of water is added; and the resultant 2-phase mixture is concentrated by vacuum distillation until precipitation occurs. The precipitate is filtered off, washed with water, and dried in air. The material thus isolated is 3',4',5',6'-tetrahydro - 3 - methoxyspiro[estra-2,5(10)-diene-17,2'-[2H]pyran].

C. *3',4',5',6' - tetrahydrospiro[estr - 4 - ene - 17,2'[2H] pyran]-3-one.*—A suspension of 10 parts of 3',4',5',6'-tetrahydro - 3 - methoxyspiro[estra-2,5(10)-diene-17,2'-[2H]pyran] in a mixture of 80 parts of methyl alcohol, approximately 7 parts of concentrated hydrochloric acid, and 5 parts of water is stirred at room temperatures for 2 hours, whereupon solution occurs. Approximately 1000 parts of cold water is mixed in, precipitating an oil which is extracted with ethyl acetate. The extract is washed with water, dried over anhydrous sodium sulfate, and stripped of solvent by distillation. The oily residue is 3',4',5',6'-tetrahydrospiro[estr - 4 - ene - 17,2'-[2H]pyran]-3-one, which crystallizes in contact with ethyl acetate. The product is isolated by filtration and further purified by recrystallization from a mixture of ethyl acetate and hexane. The product melts at 131–133° and has the formula

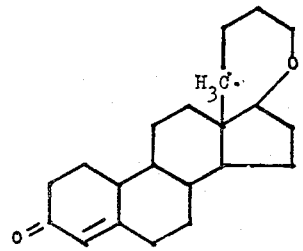

EXAMPLE 5

A. *3',4',5',6' - tetrahydrospiro[estr - 5(10)-ene-17,2'-[2H]pyran]-3-one.*—To a solution of 500 parts of 3',4',5', 6'-tetrahydro - 3-methoxyspiro[estra-2,5(10)-diene-17,2'-[2H]pyran] in 8000 parts of methyl alcohol at the boiling point under reflux is added, with agitation, a solution of 25 parts of oxalic acid dihydrate in 1800 parts of water. Boiling under reflux is continued for a further 6 minutes, whereupon the reaction mixture is diluted with a solution of 33 parts of sodium bicarbonate in 1000 parts of water, followed by 40,000 parts of cold water whereby the desired 3',4',5',6'-tetrahydrospiro-[estr-5(10)-ene-17, 2'-[2H]pyran]-3-one is precipitated. The product is isolated by filtration, washed with water, and dried in air.

B. *3',4',5',6' - tetrahydrospiro[estr - 4 - ene-17,2'-[2H] pyran]-3-one.*—Substitution of 18 parts of 3',4',5',6'-tetrahydrospiro[estr - 5(10) - ene - 17,2'-[2H]pyran]-3-one for the 4',5' - dihydrospiro[estr - 5(10) - ene-17,2'(3'H)-furan]-3-one called for in Example 2B affords, by the procedure there detailed, 3',4',5',6' - tetrahydrospiro[estr-4-ene-17,2'-[2H]pyran]-3-one melting at 131–133° and identical with the product of Example 4C.

EXAMPLE 6

A. *4 - (3β,17β - dihydroxyandrost-5-en-17α-yl)-butanol.*—To a suspension of 17 parts of lithium aluminum hydride in 630 parts of tetrahydrofuran is added, with agitation, during 10 minutes, a solution of 50 parts of 4-(3β,17β - dihydroxyandrost-5-en-17α-yl)butanoic acid γ-lactone in 1125 parts of tetrahydrofuran. The resultant mixture is heated at the boiling point under reflux with continued agitation for 2 hours, then is allowed to stand at room temperatures for 18 hours. A mixture of 126 parts of tetrahydrofuran and 10 parts of water is thereupon slowly introduced, followed by a similar addition of 75 parts of water. The precipitate which forms is filtered off and washed with 225 parts of tetrahydrofuran, and these washings are combined with the filtrate. The resultant solution is concentrated to ⅓ its original volume by vacuum distillation, and the concentrate is diluted with 3000 parts of water. The precipitate thrown down is collected on a filter, washed thereon with water, dried in air, and recrystallized from ethyl acetate to afford 4-(3β,17β-dihydroxyandrost-5-en-17α-yl)butanol melting at 224–227°.

B. *3',4',5',6' - tetrahydrospiro[androst - 5 - ene - 17,2'-[2H]pyran]-3β-ol.*—A solution of 34 parts of 4-(3β,17β-dihydroxyandrost-5-en-17α-yl)butanol in a mixture of 34 parts of p-toluenesulfonyl chloride and 600 parts of pyridine is held at 25° for 18 hours, then hydrolyzed by adding 5000 parts of a mixture of ice and water. The gummy solid which separates solidifies on agitation in the liquid phase. The material is filtered off, washed with water, dried in air, and suspended in a solution of 30 parts of potassium tert-butoxide in 920 parts of tert-butyl alcohol. The suspension is heated at the boiling point under reflux with agitation for 2 hours, whereupon it is cooled to 25° and diluted with 2100 parts of ether. The resultant solution is washed well with water and then saturated brine, dried over anhydrous sodium sulfate, and stripped of solvent by vacuum distillation. The oily residue is chromatographed on silica gel, using benzene and ethyl acetate as developing solvents. From an eluate comprising 10% ethyl acetate in benzene, on evaporation of solvent and recrystallization of the residue from a mixture of ethyl acetate and hexane, 3',4',5',6'-tetrahydrospiro-[androst-5-ene-17,2'[2H]pyran]-3β-ol melting at 144–149° is obtained.

C. *3',4',5',6' - tetrahydrospiro[androst - 4 - ene - 17,2'-[2H]pyran]-3-one.*—A mixture of 7 parts of 3',4',5',6'-tetrahydrospiro[androst - 5 - ene - 17,2'[2H]-pyran]-3β-ol, 7 parts of aluminum isopropoxide, 54 parts of cyclohexanone, and 360 parts of dry toluene is heated at the boiling point under reflux in an atmosphere of nitrogen with agitation for 30 minutes, then hydrolyzed by the cautious introduction of approximately 31 parts of saturated aqueous Rochelle salt solution. The mixture thus obtained is steamed distilled until the distillate comes over clear, at which point the distilland is cooled to 25° and insoluble solids removed therefrom by filtration. The solids, washed well with water, dried in air, and recrystallized from ethyl acetate, afford 3',4',5',6'-tetrahydrospiro[androst-4-ene-17,2'-[2H]pyran] - 3 - one melting at approximately 170°. Sublimation occurs in process. The product has the formula

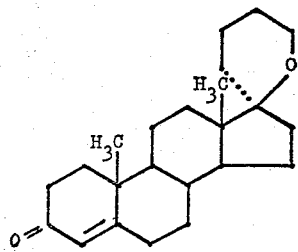

What is claimed is:
1. A compound of the formula

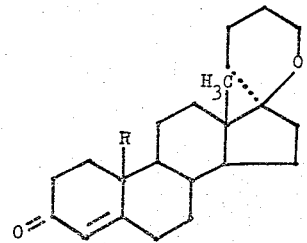

wherein R is selected from the group consisting of hydrogen and the methyl radical.

2. A compound according to claim 1 which is 3',4',5',6'-tetrahydrospiro[estr-4-ene-17,2'-[2H]pyran]-3-one.

3. A compound according to claim 1 which is 3',4',5',6'-tetrahydrospiro[androst-4-ene-17,2'-[2H]pyran]-3-one.

4. A compound of the formula

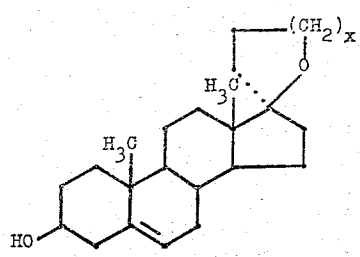

wherein x represents a positive integer less than 3.

5. A compound according to claim 4 which is 4',5'-dihydrospiro[androst-5-ene-17,2'(3'H)-furan]-3β-ol.

6. A compound according to claim 4 which is 3',4',5',6'-tetrahydrospiro[androst-5-ene-17,2'-[2H]pyran]-3β-ol.

7. 3',4',5',6'-tetrahydro - 3 - methoxyspiro[estra-1,3,5(10)-triene-17,2'-[2H]pyran].

References Cited
UNITED STATES PATENTS
3,297,686  1/1967  Brown _____ 260—239.55

ELBERT L. ROBERTS, *Primary Examiner.*

HENRY FRENCH, *Examiner.*